US 8,055,688 B2

(12) United States Patent
Giblin

(10) Patent No.: US 8,055,688 B2
(45) Date of Patent: Nov. 8, 2011

(54) METHOD AND SYSTEM FOR META-TAGGING MEDIA CONTENT AND DISTRIBUTION

(76) Inventor: Patrick Giblin, San Diego, CA (US)

(*) Notice: Subject to any disclaimer, the term of this patent is extended or adjusted under 35 U.S.C. 154(b) by 550 days.

(21) Appl. No.: 12/191,877

(22) Filed: Aug. 14, 2008

(65) Prior Publication Data

US 2009/0150406 A1 Jun. 11, 2009

Related U.S. Application Data

(60) Provisional application No. 61/012,368, filed on Dec. 7, 2007.

(51) Int. Cl.
*G06F 17/30* (2006.01)
(52) U.S. Cl. ........ 707/804; 707/702; 707/752; 715/205; 715/234
(58) Field of Classification Search .................. 707/723, 707/752, 778, 805, 702, 804; 715/201, 202, 715/210, 205, 234
See application file for complete search history.

(56) References Cited

U.S. PATENT DOCUMENTS

| 2004/0220926 | A1 | 11/2004 | Lamkin et al. |
| 2005/0022114 | A1 | 1/2005 | Shanahan et al. |
| 2006/0080314 | A1 | 4/2006 | Hubert et al. |
| 2007/0250863 | A1 | 10/2007 | Ferguson |
| 2008/0086689 | A1* | 4/2008 | Berkley et al. ............... 715/731 |
| 2008/0120325 | A1* | 5/2008 | Davis ........................... 707/102 |
| 2009/0062681 | A1* | 3/2009 | Pradeep et al. .............. 600/544 |

* cited by examiner

*Primary Examiner* — Cheryl Lewis
(74) *Attorney, Agent, or Firm* — DLA Piper LLP (US)

(57) ABSTRACT

A unique application within Video that allows for user generated Meta-tagging to be delivered in real time to individual clips is provided. This meta-tag creates its own tail based upon the user generated words population, which is searchable via a "spider network" that runs invisible behind the web pages of the site. These same "tagged" words are broadcast over various delivery networks including but not limited to live feeds from SMS, MMS, News Feeds within Community Web Sites, Video Sharing Web Sites, Widget applications any other forms of electronic communication that will be dropped in real time to identified users and friends of users.

39 Claims, 10 Drawing Sheets

FIG. 1

FIG. 2

ACTIVE CURSOR AT ALL TIMES ALL WORDS IMPORT TO DATA SOURCE THAT MATCHES THE VIDEO FILE WITH IT.

[ I ] [ 451 ID ] [ PGIBLIN ]

META TAG FEATURE — ALLOWS SIGNED IN USER TO ACTIVLY TYPE WORDS ASSOCIATE W/VIDEO FILE PLAYING. IT WILL SORT THESE WORDS WITH PROFILE NAMES OD EM'S. IT WILL THEN NEWS FEED INTO THE OTHER SOCIAL NETWORK SITES AS WELL AS WITHIN THE 451 NEWS FEED LINE.

—ALL TAGGED WORDS ATTACH TO THE DATA SOURCE WITHIN THE VIDEO FILE SO THEY MATCH AND CAN BE SEARCH FRIENDLY WITHIN THE SITE AS WELL AS PROFILES AND CAN BE SENT AS A DIRECT URL LINK THAT REQUIRES LOG ACCESS. CTA TO CREATE PROFILE FOR THOSE THAT DON'T HAVE AN ACCOUNT.

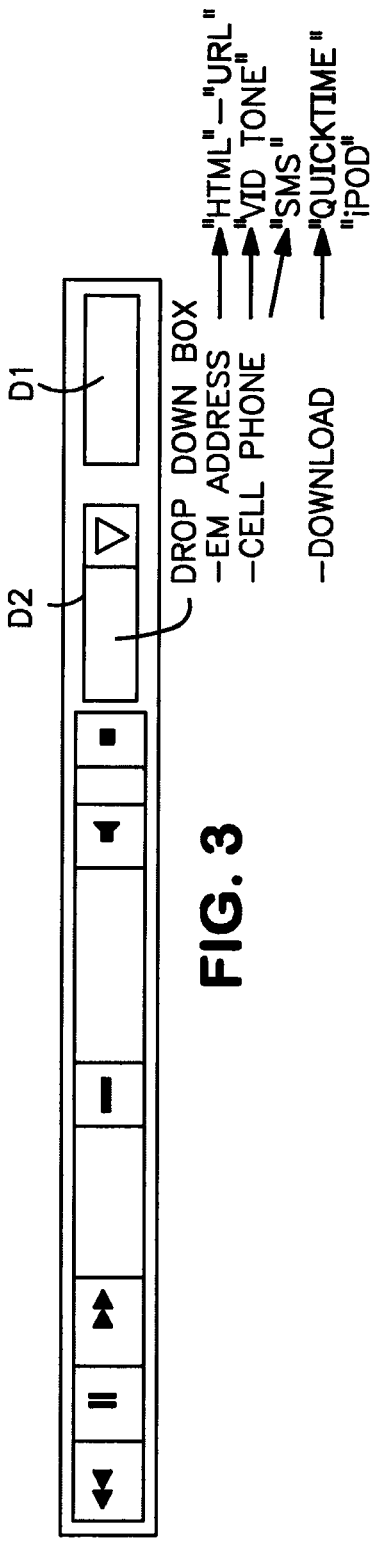

— DROP DOWN BOX → "HTML" — "URL"
— EM ADDRESS → "VID TONE"
— CELL PHONE → "SMS"
→ "QUICKTIME"
→ "iPOD"

— DOWNLOAD

"FEATURED VIDEOS" -OPTION THAT
WILL SORT ACCORDING TO
OF TIMES PICKED FOR
CUSTOM PLAYLIST.
451 ADMIN CONTROLS
└ RADIO BUTTONS
  ○ TOP PICKS
  ○ CUSTOM/ADMIN PICKS

BOX CHECK TO MAKE
VIDEO PART OF PLAYLIST

451 Degrees Videos

SEARCH [ ] ▶

| Featured Videos | ALL ☐ | Date |
|---|---|---|
| 451 Degrees | ☑ | 2007-05-28 |
| Fire House Grand Opening | ☐ | 2007-07-26 |
| On Broadway Freedom Five | ☐ | 2007-09-29 |
| Corey Biggs 2nd Fish Out of Water Party 1 of 3 | ☐ | 2007-09-03 |
| BT Interview 1 | ☐ | 2006-09-22 |
| BT Interview 2 | ☐ | 2006-09-22 |
| BT Interview 3 | ☐ | 2006-09-22 |
| BT Interview 4 | ☐ | 2006-09-22 |
| BT Interview 5 | ☐ | 2006-09-22 |
| BT Interview 6 | ☐ | 2006-09-22 |
| BT Interview 7 | | 2006-09-22 |
| BT Interview 8 | ☐ | 2006-09-22 |
| KRS-One party at Belo 1 | ☐ | 2007-03-08- |
| KRS-One party at Belo 4 | ☐ | 2007-03-08 |
| Mims at San Diego State. Yes MIMS. To see full Mims video search for Mims | ☐ | 2007-09-22 |
| Fender Fashio Show 1 of 8 | ☐ | 2006-08-12 |
| Fender Fashio Show 2 of 8 | ☐ | 2006-09-12 |
| Fender Fashio Show 3 of 8 | ☐ | 2006-08-12 |

DRAG N
DROP
ORDERS OF
VIDEO

CREATE FEATURE
BUTTONS
"IN ORDER"
"SHUFFLE"

FIG. 7

METHOD AND SYSTEM FOR META-TAGGING MEDIA CONTENT AND DISTRIBUTION

RELATED APPLICATIONS

This application claims priority under 35 U.S.C. §119(e) of U.S. Provisional application, Ser. No. 61/012,368 filed Dec. 7, 2007 which is hereby incorporated by reference in its entirety.

BACKGROUND OF THE INVENTION

1. Field of the Invention

The present invention relates generally to media players and other platforms of media distribution, and more specifically to finding, capturing, sharing and meta-tagging media content among users.

2. Background Information

Television and other video content are increasingly being delivered to consumers in new ways. For example, the digital video recorder is an example of a device that leverages the flexibility of digital media and its storage to provide a new level of convenience relating to television viewing as well as recording. Also, television programming and a myriad of other multimedia are increasingly finding a home on new devices. For example, television programming is no longer found solely on the television. Through computer networks, as well as other delivery mechanisms, television and other media content are increasingly becoming available on other devices, such as personal computers, mobile phones, PDAs, and other portable computing devices. The broader availability of media on these devices, as well as the inherent flexibility of digital media also provides a host of new ways for consumers to share content and its relevance with the masses and individuals through meta-tags that end users input into this medium, thus making it easier to search within a number of different databases and search engines.

Sharing video, information, images and other content with communities of others is becoming increasingly popular. Web sites which host content uploaded by others for sharing, such as YouTube™, Veoh, Brightcove, Metacafe, Hulu and others are also becoming quite popular. However, the percentage of individuals that actually contribute via meta-tags and identification of individuals, places, brands and other relevant information within video content is non-existent. Platforms upon which consumers watch video, and the sources of such video, such as televisions, DVRs, personal computers, and mobile phones, do not provide for a sufficiently integrated and easy to use solution for content meta-tagging and informational feed of those tags to a relevant audience and engine.

To date, technology does not exist to allow multiple people to type over video feed with their own meta-tag and informational input. Such technology would assist with the cluttered 'mess' that has been crippling Video Search Engines, as the meta-tags will increase the "truth" in how key word search can match to video content. Meta-Tags can create "Top Words" associated with the Video as the true Meta-Tags through continued user feedback Thus, there is a need for an improved system and process for users identify and find media content and share the media content with other users. The present invention allows for use on multiple platforms and locations wherever video is viewed.

SUMMARY OF THE INVENTION

The present invention is based on the seminal discovery of a unique application within Video that allows for user generated Meta-tagging to be delivered and sorted based upon commonality in real time to individual clips. This meta-tag creates its own tail based upon the user generated words population, which is searchable via a "spider network" that runs invisible behind the web pages of the site. These same "tagged" words are broadcast over various delivery networks including but not limited to live feeds from SMS, MMS, News Feeds within Community Web Sites, Video Sharing Web Sites, Widget applications any other forms of electronic communication that will be dropped in real time to identified users and friends of users. The application is termed Graffiti™.

The present invention provides a web-based community in conjunction with a unique and highly sophisticated interactive multimedia platform where users are able to view themselves, communicate with and see other faces/places that they previously "knew" but did not "know". The system described herein will facilitate the new wave of online access to meta-tag via the "graffiti" product. Members of the web-based community described by the present invention are meta-tag via video stream on any platform that allows for a user interactive experience. These same video streams become Video Content to a number of different websites. In addition, video content is being distributed to cellular phone carriers as Video Tones for personal use via meta-tag key word alerts. The present invention allows "On Deck" cellular and Computer applications for end users utilizing the latest meta-tag technology and distribution. The invention system will maximize the cutting edge elements of multi-media—Community Web Sites, Internet Video, Cellular phones, DVR's, Computers, PDA's, Smart Phones, Satellite Phones and other portable computing devices. As well as establishing partnerships and delivering content to the recognized monsters of Media—Television, Print and Radio as they make aggressive moves into Digital Media and Web Content Video identification through this meta-tag strategy and solution.

For example, a user that is watching a video connected through their computer may see something or someone that catches his interest. Furthermore, he may have a desire to share what he just saw with a friend or a community of individuals. The Graffiti application allows that individual to type in the words or numbers that he feels best describe the video being seen. Those words are then shadowed into the web site as text and are to be seen by the web-browsing spiders. Those same words are then distributed via outlets and "News Feeds" or "Graffiti Feeds" that alert people that they have been "tagged". The feeds are based upon users typing in the words or numbers that matter to them and they want alerts to. These words are then sorted and ranked according to commonality and relevancy rankings amongst viewers and locations. Once that file is created, the user can then visit a community web site, which may have its own tools for allowing the consumer to upload, view, publish or distribute the video. As part of this process, the video will have entire new tags being dropped into it that will increase its focus and truth within different search engines and locators of content.

In one embodiment, the invention provides a computer-implemented method for sharing media content comprising playing a media stream on a display of a local computing device; receiving a user command to meta-tag a portion of the media stream via a user interface while playing the media stream; creating meta-tags related to at least a portion of the received media stream via the users input; and transmitting the meta-tag data to a remote computing and distribution system. In one aspect, the media stream is received from a media system.

In another embodiment, the invention provides a computer program product for sharing media content, the computer program product including a computer-readable medium containing computer program code for performing a method including playing a media stream on a display of the local computing device; receiving a user command to identify a portion of the media stream via a user interface while playing the media stream; responsive to receiving the user selection, creating a meta-tag associated with a portion of the received media stream; and responsive to creating the meta-tag, transmitting the meta-tag to a remote computing and distribution system.

In another embodiment, the invention provides an integrated media system for sharing media content comprising a media player module for playing a media stream, the media stream received by the integrated media stream; a media editor module for catching the media stream, receiving user selection and relevant meta-tag of the media stream, and creating a clip comprising at least a portion of the media stream based on the user selection; and a network client module for transmitting the meta-tags to a remote computing or distribution system.

In yet another embodiment, the invention provides a method for sharing media content including receiving a media stream on a local computing device; playing the media stream on an integrated user interface; receiving a user command to meta-tag the media stream via the integrated user interface; responsive to receiving the user command, displaying a media meta-tag window via the integrated user interface; receiving a user meta-tags for defining a portion of the media stream via the media edit window; responsive to receiving the user selection, creating a meta-tag comprising the defined portion of the media stream based on the user input; transmitting the meta-tag data to a computing system via the integrated user interface; and responsive to receiving meta-tags, transmitting the clip to the distribution channel system associating the video with these key words throughout based upon the system rank, category systems and formulas.

In one aspect, the method of sharing media content further includes receiving meta-data information related to the video via the integrated user interface; associating the received information with the video and optionally ranking that the information in relation to others seen and other information received.

The invention also provides a computer program product for sharing media content as well as the computer-readable medium itself. The computer program includes a computer-readable medium containing computer program code for performing a method as described herein. The method includes receiving a media stream on a local computing device; playing the media stream on an integrated user interface; receiving a first user command to meta-tag the media stream via the integrated user interface; responsive to receiving the user command, displaying a media edit window via the integrated user interface; receiving a user meta-tag for defining a portion of the media stream via the media edit window; responsive to receiving the user meta-tag, creating a meta-tag comprising the defined portion of the media stream based on the user entry; transmitting the clip to a computing and distribution system via the integrated user interface; and responsive to receiving the meta-data command, transmitting the video to the computer, data and distribution system.

Embodiments of the invention allow users to meta-tag media content from a media source or stream while playing it and then share the tagged data media content with other users through an integrated user interface in a media device or other sources of informational feed.

In one aspect, the media device receives and plays the media stream. While viewing the media, a user provides a user interface with a command prompt within the player that allows the viewer to insert meta-tags into the video while it is being played on the device. In one embodiment, the user can use the user interface to input meta-data describing the clip. This data is then sorted in the databases to match with the video clip and relevancy in relation to other data. The media device creates the meta-tag based on multiple users input and transmits the clip to another system, such as a community website and database for sharing the clip with other users via numerous promotional and announcement chains.

In yet another embodiment, the invention provides a method of providing content produced by a method of the invention as described herein, to a user, comprising accessing the content; tracking the content accessed, an associated provider or providers for the accessed content, the number of times the content was accessed, and a fee associated with use of the content. Typically, this includes determining a service fee or license fee for access to the content. Content is typically selected from text, a symbol, an image, a movie or portion thereof, an audio clip, a video clip, or any combination thereof. Content is typically from one or more of local memory, an internet connection, On Air, via Radio Frequency (RF), over a cable network, Satellite, a wireless connection, a remote server, a portable memory device, a compact disk, digital video disk, optical disk, magnetically recorded tape, digitally recorded tape, a computer, or a scanned image.

Accessing content may include selection by the user of a content category; searching for content in the content category; and providing search results to the user, and optionally printing a transaction record. The transaction record may comprise one or more of a list of accessed content, the fee for each accessed content, the service fee, copyright information on accessed content, or a federal copyright protection warning, for example.

"Top Words" becomes meta data active for search, relevancy, posting based upon user inputs in real time. The system allows for different relevant numbers and data to be posted based upon permissions of the user and/or content owner. These words are constantly updated by anyone viewing the video and choosing to participate. It also calls for the blogs within a site where the video is posted to be scrubbed and factored into the formula as relevant as well.

BRIEF DESCRIPTION OF THE FIGURES

FIG. 1 is a diagram of the media device Graffiti in accordance with one embodiment of the invention. As illustrated, the media device Graffiti includes a media player module known as Big Player (BP), in this Player will be the media editor module "Graffiti" (X), network Video Selection Module (I), a Download Feature (D1), a Delivery Feature for SMS, MMS, RSS and any other electronic delivery format in drop down (D2) (See FIG. 3). The media device, X, I, D1, D2 and M are communicatively connected to a Video Server and a Data server distributing and matching information in accordance with file input and delivery.

FIG. 2 shows the media meta-data input device. Graffiti includes hardware and/or software devices that are configured to enable users to view media content; add meta-data in real time, and associate meta data with the media clip ("Graffiti"); and share the recorded media clip with others through integrated user interfaces. This widget can be embedded into any location where video plays and there is a connection of some sort to the Internet available for data transfer.

FIG. 3 shows the media Graffiti module of FIG. 12 wherein the media editor module can be further configured to converting the defined media clip from one media format to another or perform any other transcoding, encoding, or other processing on the clip as desired via buttons D2 or D1.

FIG. 7 is a further illustrative example of content categories catalogued by The Network owner and searchable by the user.

DETAILED DESCRIPTION OF THE INVENTION

Figure 4:
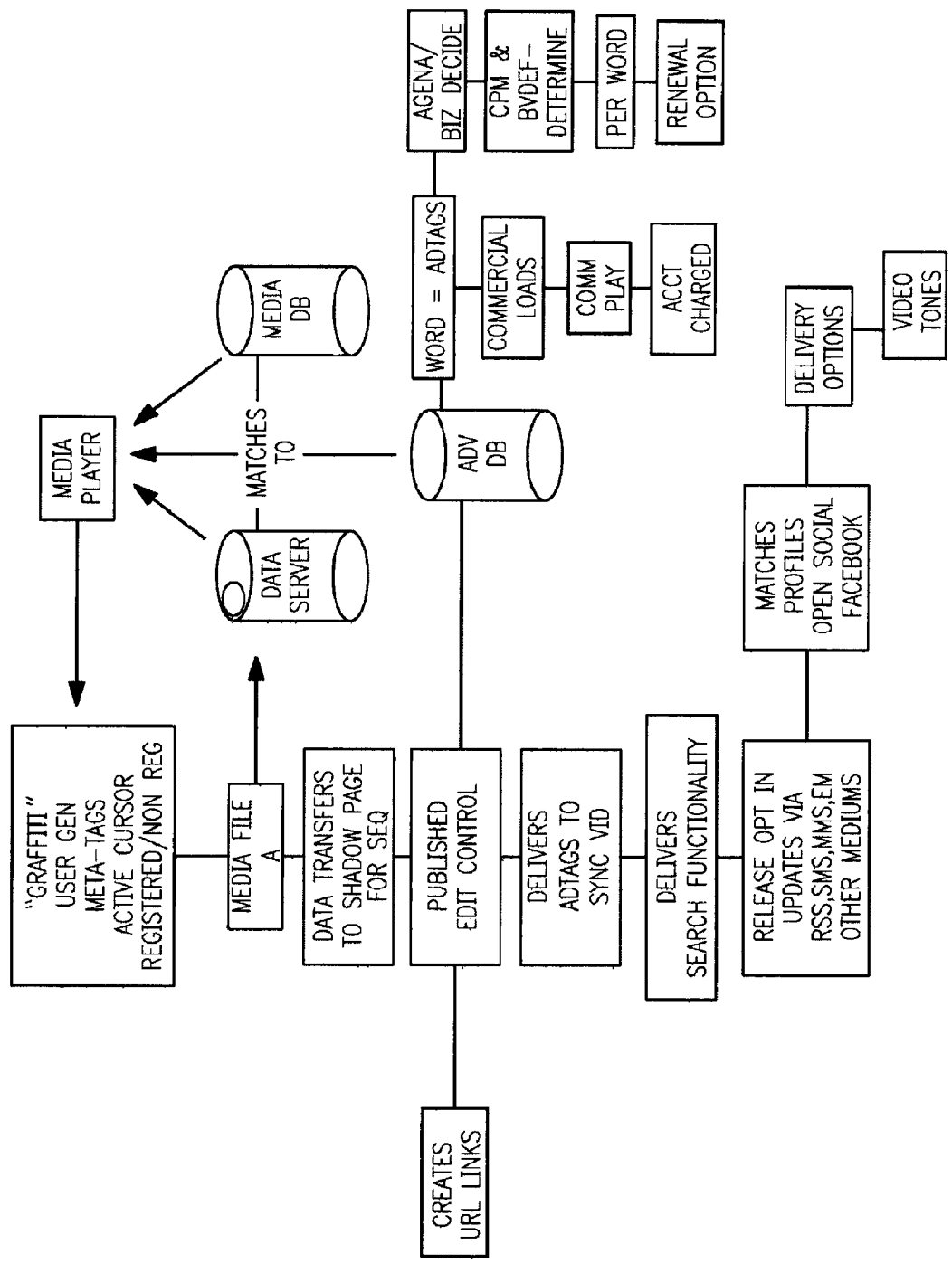
FIG. 4 is a diagram of the architecture of a media content management system in accordance with one embodiment of the invention.

The present provides an integrated user interface to users of a media device to view media content, record media clips, edit the clips, associate the clips with relevant meta data, and share the processed media clips with others. As used herein, media content and media clips may include any type of media content, including audio or video content, or both. Users can view a media stream, meta-tag via a live cursor, a portion of the media stream they deemed interesting, and send the meta-tag data to others using the numerous distribution channels made available via Search Engines Key Words, News Feeds within Web Sites, "Graffiti Feeds", SMS, MMS, RSS feeds, Cellular Video Feeds, Cellular Video Channels, EM alerts or any other information subscription feed.

Embodiments of the invention allow users of a media content management system to meta-tag media content as it plays in front of them. Users of the media content management system can meta-tag clips playing in The Network to share the uploaded media content and information of relevance to others, who can search, find or be alerted to that media content from The Network. Alternatively, the media may ultimately be distributed to viewers via a peer-to-peer distributed system. That is, the content may be alternatively stored on the computers and other devices of the end users of The Network. When a user wishes to view a clip from The Network, the clip is sourced from one or more of the other users, or peers.

Embodiments of the invention may also enable the operator of the media content management system to generate advertising revenue. The Network combines media content, meta-tags and site source profiles with advertisements and provides the combined media content and advertisements to users upon their requests for the media content. The advertising revenue includes advertising fees paid by advertisers for providing their advertisements to the users. The advertising revenue can be shared with the content distributors with the content owners permission to share their revenue with the distributors of The Network. Advertisements may be sold by the operator of the media content management system or the content owners. Advertisements may also be sold via the use of an automated ad purchase system using key words or other meta-data available, which is associated with a clip, or series of clips. That is, a small business may want to place an ad opposite key words or key tags. Perhaps through a web interface, the small business owner could purchase the ad and upload the creative content, which would be shown as an advertisement whenever a clip of the desired key words is viewed by a user or within the general video library as a whole.

Media Device Architecture

Figure 1:
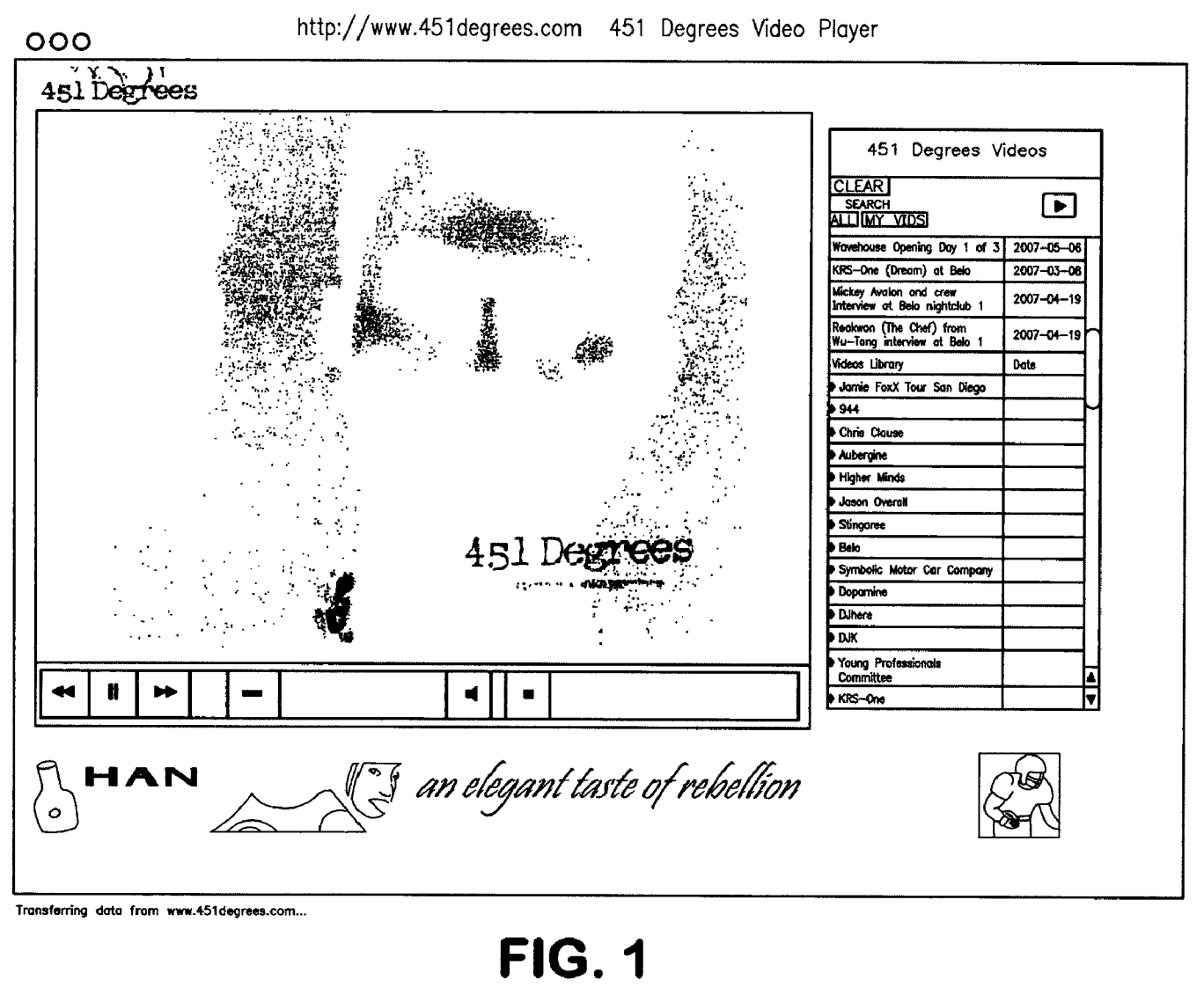

FIG. 1 is a diagram of the media device Graffiti in accordance with one embodiment of the invention. As illustrated, the media device Graffiti includes a media player module known as Big Player (BP), in this Player will be the media editor module "Graffiti" (X), network Video Selection Module (I), a Download Feature (D1), a Delivery Feature for SMS, MMS, RSS and any other electronic delivery format in drop down (D2). The media device, X, I, D1, D2 and M are communicatively connected to a Video Server and a Data server distributing and matching information in accordance with file input and delivery. Upon receipt of the data it is matched to file, its location and sorted in accordance with formulas to build more relevance.

The media meta-data input device Graffiti (FIG. 2) includes hardware and/or software devices that are configured to enable users to view media content; add meta-data in real time, and associate meta data with the media clip ("Graffiti") and make data relevant to ranking system of Meta Tags system and formulas within system; and share the recorded media clip with others through integrated user interfaces. The media device Graffiti is adapted to execute computer program modules. As used herein, the term "module" refers to computer program logic and/or data for providing the specified functionality. A module can be implemented in hardware, firmware, and/or software.

In one embodiment, the media device Graffiti is a software application running on any general or multi-purpose device (such as a personal computer, mobile device, cellular phone, or any other computing or communication device with sufficient capabilities for these tasks), beneficially avoiding the need for users to carry special equipment to transmit media or data content to and/or receive media or data content from the media and or Data management servers. Alternatively, the media device Graffiti can be active through many different formats, which allow for data to be transferred and thus meta-tagged to a relevant clip for future search reference from multiple sources and at times overlapping for more defined relevancy.

The media player BP is configured to play media content received from the media Server, which may be any source of media. The media data device Graffiti content may be delivered to the media player, its servers and data servers in a variety of ways, including over the air transmission (analog and digital), via cable infrastructure, Mobile Networks, IP transport (via wired and wireless means), satellite transmission, as well as through many other methods. The models for delivery of content to the media data device Graffiti may vary, including pay-per-view, linear programming, on demand streaming, download and playback, and live streaming from another location, among many others.

The media Graffiti module (FIG. 2) is configured to provide users with functionality creating unique real time meta-tags to the media content played by the media player module. In one embodiment, the media Graffiti module can send data updates to provide updates via numerous feeds and electronic messaging including but not limited to; RSS, News feed, SMS, MMS, e-mail. Users with an editing window to define a media clip while watching this content. This allows a user to view, process, meta-tag, and send a clip that they recently viewed. The media editor module can be further configured to converting the defined media clip from one media format to another or perform any other transcoding, encoding, or other processing on the clip as desired via buttons D2 or D1 in FIG. 3.

The network client module is configured to transmit the recorded media clip meta-tags and requests for delivery to the data and Video servers, or alternatively, directly via electronic notice to other end users in a distributed storage and distribution architecture. The network client module can be configured to connect with the data and Video servers through a wired or wireless network. Examples of the network include the Internet, an intranet, a cellular network, or a combination thereof. The server can be a web server, an email server, or other computing devices with network capacity.

The media broadcaster transmits the media content to the media devices and servers from Graffiti input application. It can be a central server at a remote broadcasting location, or a computer at a user's home. In one embodiment, the media broadcaster can be a time-shifting device (e.g., a personal video recorder) or a placeshifting device (e.g., a personal broadcaster). In placeshifting, a user can watch or listen to live, recorded or stored media on a remote device via a data network. For example, a user may stream content from a device at home (such as a satellite receiver, cable box, or digital video recorder) to a cellular phone, which can receive the media from across the house, across town, or across the world. This transmission may use public or private networks. A product that currently provides such a placeshifting application is the SLINGBOX™ From Sling Media, Inc., and described in co-pending U.S. application Ser. No. 11/147, 664, filed Jun. 7, 2005, the content of which are incorporated by reference in its entirety.

Operation of Media Device

FIG. 4 is a flowchart of a process of the media device Graffiti for meta-tags and sharing media videos in accordance with one embodiment of the invention. The process illustrated in FIG. 4 may be implemented in software, hardware, or a combination of hardware and software. The process is intended to sit in a plurality of locations and allow for multiple users to input relevant data.

The process illustrated in FIG. 4 starts with the media device Graffiti receiving media content from the media server. The media content can be in the form of a media stream (e.g., television broadcasting). One example of this real time user meta-tag interface is illustrated in FIG. 2. The user interface in FIG. 2 includes a media display window as in FIG. 1 to display the received video stream, which includes controls for users to control the video play (e.g., volume control, record button) and indicators indicating the status of the video stream (e.g., network transmission speed, video stream status, and video stream titles). If the player is paused all of the meta-data created and captured within that segment will be tagged to that clip within the data server related to the video.

Referring back to FIG. 2, the media device Graffiti receives a command from a user to meta-tag a portion of the media. The user may submit the command by interacting with the integrated user interface. All the user does is type within the cursor box as they see things to tag and hit return to deliver to the database and distribution centers (e.g., Cursor Queue) using a pointing device (e.g., a mouse or touch sensitive screen) or using a keypad. Alternatively, the user may submit the command using devices such as a cell phone or remote control (e.g., a remote control for a DVR, cable box, satellite receiver, or other media source).

Once the device Graffiti receives the command, the media editor module may bring up a media editing window in the integrated user interface and allow the user to pause the player to give more time to meta-tag video clips. The media-editing window allows the user to input whenever they want. In one embodiment, as the media player module plays the media stream, the media editor module "graffiti", continually captures all tags up to the final 10 seconds (or some other designated time period) of media content played.

One example of this user interface is illustrated in FIG. 2. The user interface in FIG. 2 displays the meta-tag window adjacent to the media play window (BP, FIG. 1). As shown in FIG. 2, the meta-tag window is displayed adjacent to the media play window; however, the meta-tag window may be displayed as a separate window or by any other method as desired for the user interface.

The media device Graffiti may also tag information to the media clip, such as meta data that describes the clip. The information to be tagged can be manually input by the user and/or it may be automatically associated with the clip. For example, once the clip is loaded and being viewed, the user may input words, phrases, pictures, URLs, titles, actors, networks, channels, or other meta data that the user believes should be associated with the clip. Alternatively or additionally, other methods for automated tagging may be used, such as methods that automatically determine information about the content of the clip and tag the clip with that information. This information may be retrieved from a number of sources, including the settings on the computing devices and various other Internet and cellular based distribution centers. Other observed information may also be a source for tagging information, including the time of day, time zone or location, title of video, etc. The information may further include information expressly associated with the video clip, which may be delivered via the VBI, over an IP network, or by some other means. Other information, such as the web page data, web page comments, words, URL's as well as traditional closed captioning, may also be a source for automatic tagging. The information tabbed to the video media can be stored in its meta-data. In some embodiments, the user can also change the format of the media clip and set other encoding parameters, such as bit rate. All users have the ability to contribute frequency of common phrase and bring relevance to the video. The words, phrases, pictures, URLs, titles, actors, networks, channels or other meta data that users input in accordance with the ranking and formula system with the clip become most relevant for search engine optimization and all other applications within this application. The more data from more users the stronger the relevancy and value The media device player can transmit the media video as the user instructs. The user can submit the instruction through the integrated user interface or D1 or D2 in FIG. 3. For example, the media edit window can include a designated button for uploading the media clip to a community website. The user can configure the button to send automatically, manually post, or otherwise upload the media clip to the community website or other online location. The user can configure the button to link with his account in the website. The user can click the button and the network module will upload the media information relevant to the user request. Alternatively, the media Delivery (D2) window can include a drop-down menu allowing the user to select recipients of an email notification. After the media clip has meta-tags, a notice will be sent to the email addresses of the selected recipients, noticing them that the user has put meta tags or "graffiti" on a video of interest, with a pointer reference to the clip stored on the website. This allows the user to share content with a community of users rather than a particular selected person or persons. The community-sharing model also enables certain business and advertising schemes. In other embodiments, the user can also instruct the media device Graffiti to save the media clip in a local or remote location.

Alternatively, rather than uploading the media clip, the media device Graffiti may call an email client (or other local communication client) to create a new email message and attach the media clip to the message. The user can then select the intended recipients of the message and send the message. The media device Graffiti can also automatically send out the message if the recipient or destination of the video clip has already been determined. The address book databases can be those available from email clients, for example but not limited to, Microsoft Outlook, Lotus Notes, and others, as well as any Internet based messaging services, such as Yahoo, Google, Hotmail, MSN Messenger, AOL Instant Messenger and any other "Instant Messaging" or E-mail system.

Example of Process for the Media Device

The process described above can be further illustrated through an example of an operation of the media device in accordance with one embodiment of the invention. In this example, the media device is a laptop computer. The media device receives a video stream from the Video Server system and plays the video stream in an integrated user interface on the computer screen to a user.

When watching the video stream, the user sees something they would like to share. The user types in the "graffiti" cursor box (FIG. 2) integrated user interface, which immediately sends the meta-tag data to the servers and the networks of distribution for various alerts and feeds. Within the meta-tag window, the user has access to input up to the final 10 seconds (or some other duration) of video viewed. The user can also pause the clip to allow for more time to input meta-tags. The user selects the intended friends for information to be sent to (D2, D1). Meta data associated with the clip may also be added manually or automatically. The media device uploads the video clip to a community website, and sends a notification news feed, RSS, SMS, MMS, email or other electronic form with a pointer reference to the uploaded video clip to the selected locations and addresses. Multiple users can add simultaneous tags and thus creating a more relevant scheme based upon common input that is optionally ranked.

After receiving the notification, the user's friends can click the pointer and view the video clip in the website or location directed to or alternatively, the viewer can review the content in the form itself if suitable. In this instance, the individual receiving the notification has an option to participate or engage in any other way they see fit.

Similar experiences are also possible with other devices and solutions. For example, a similar experience can be had on a mobile phone that receives a video stream from a place-shifting device or any other delivery format. Alternatively, the interface can be integrated into a DVR connected to the Internet, with the meta-tagged video presented to the user via a television set and controlled via a remote control. In yet another alternative, the interface may be used on a PC that is not receiving content via a placeshifting device but rather directly via an audio video input (e.g., cable coax) into the PC. Accordingly, the process of viewing, adding meta-tags, and sending clips can be advantageously used in a number of different contexts.

Media Content Management System Structure

Figure 5:
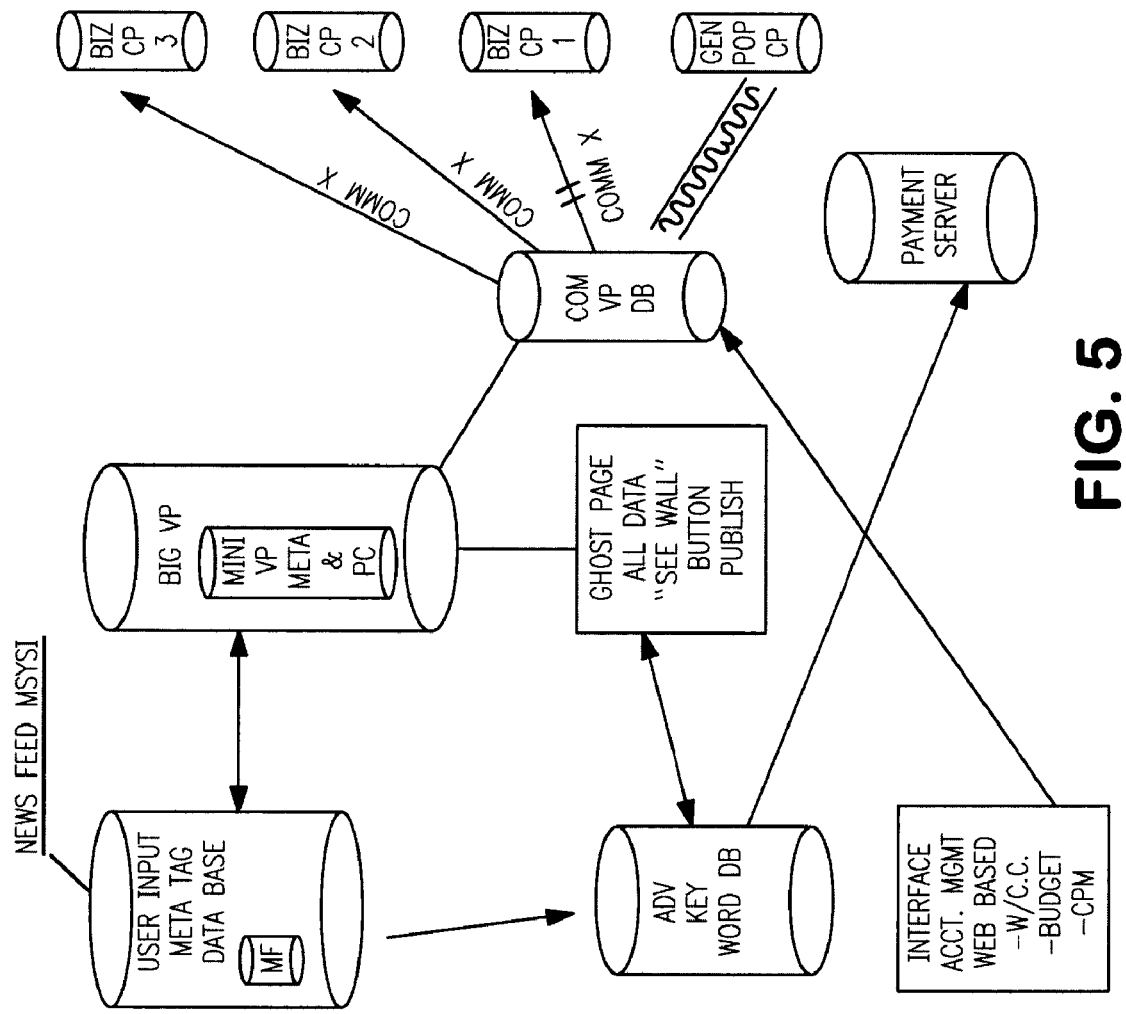
FIG. 5 is a diagram of the architecture of a media content management system in accordance with one embodiment of the invention.
Figure 6:
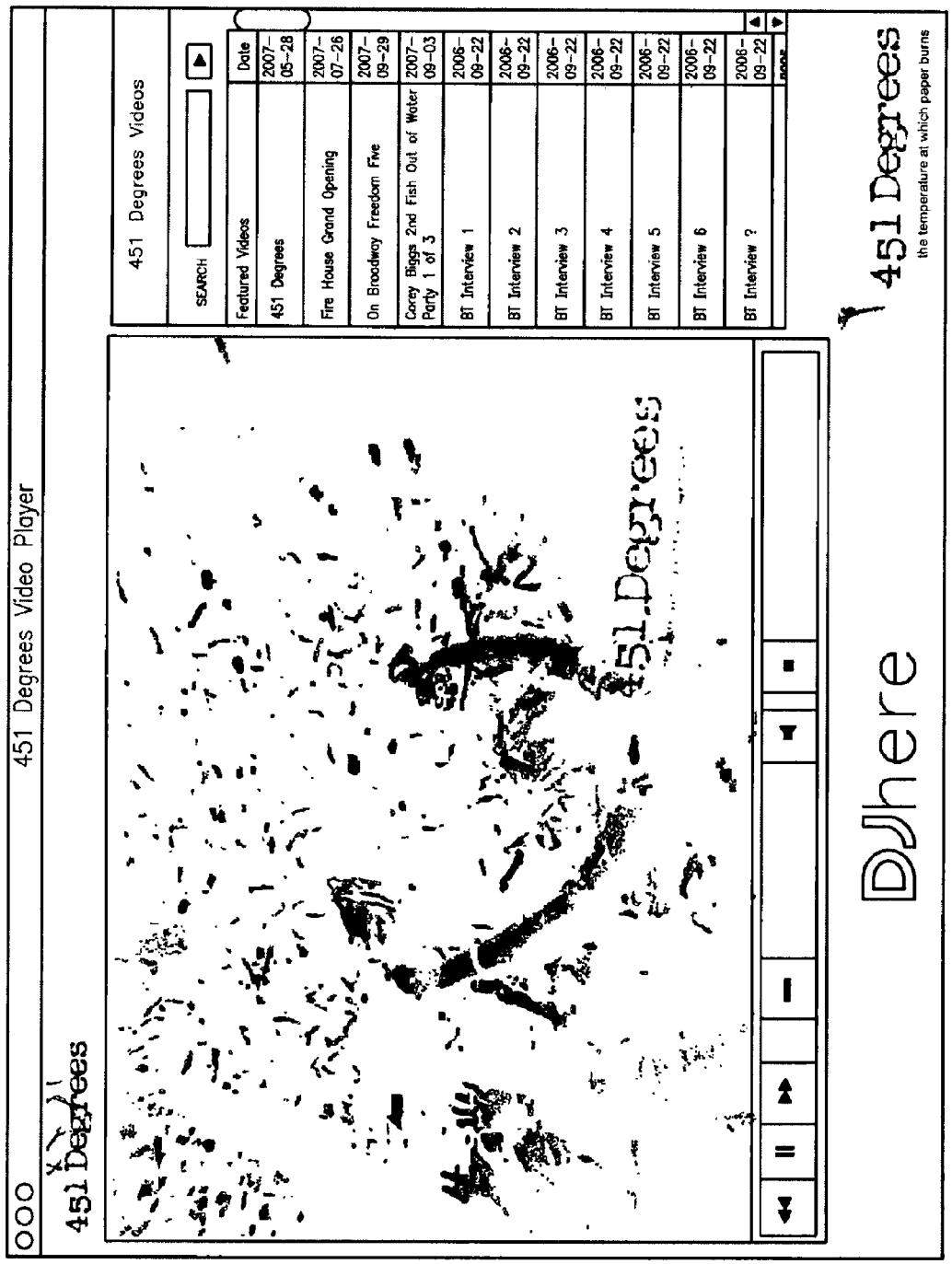
FIG. 6 is an illustrative example of content categories catalogued by The Network owner and searchable by the user.
Figure 8A:
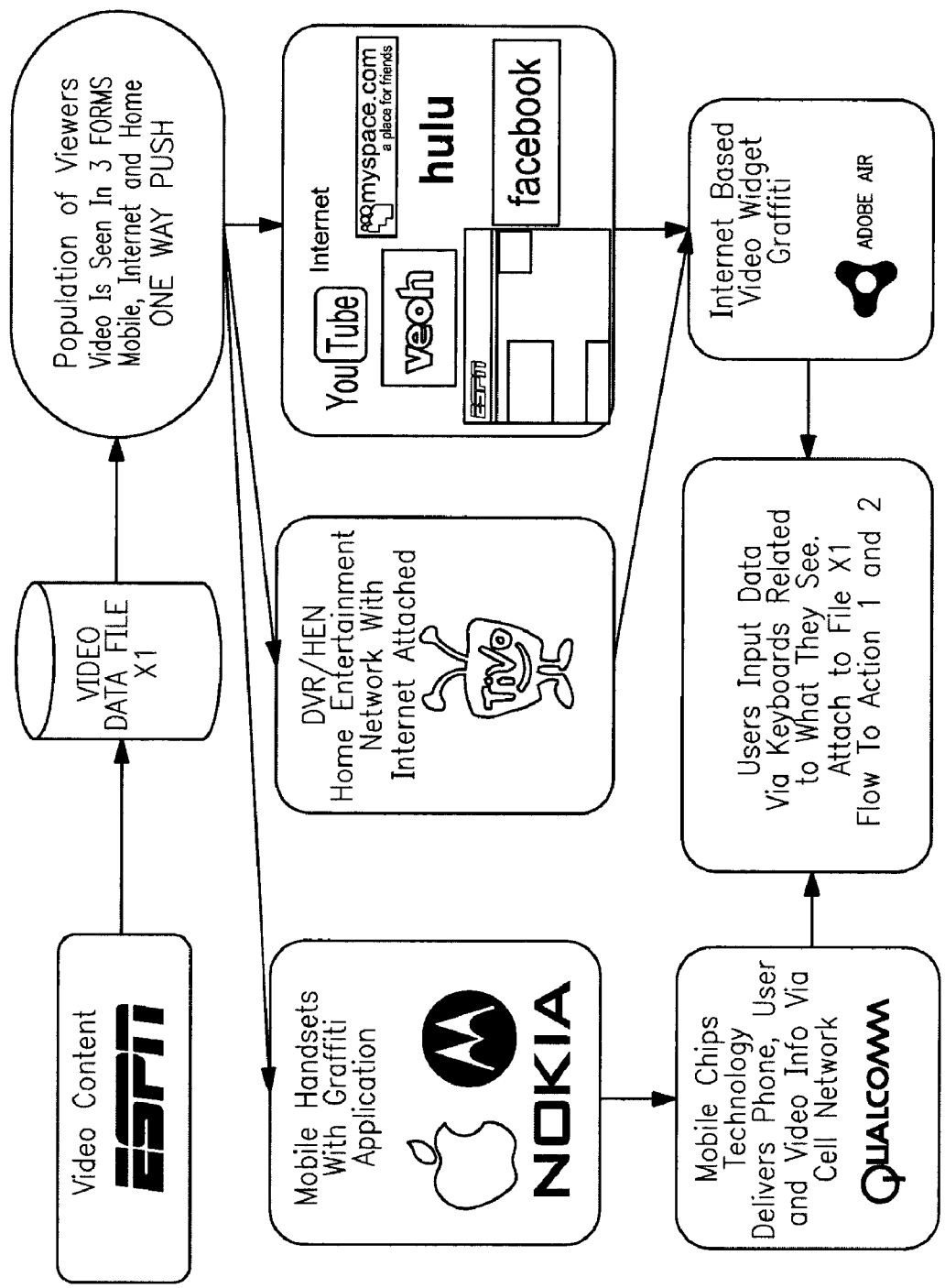
FIGS. 8A-8D show an illustrative example of the methods described herein.
Figure 8B:
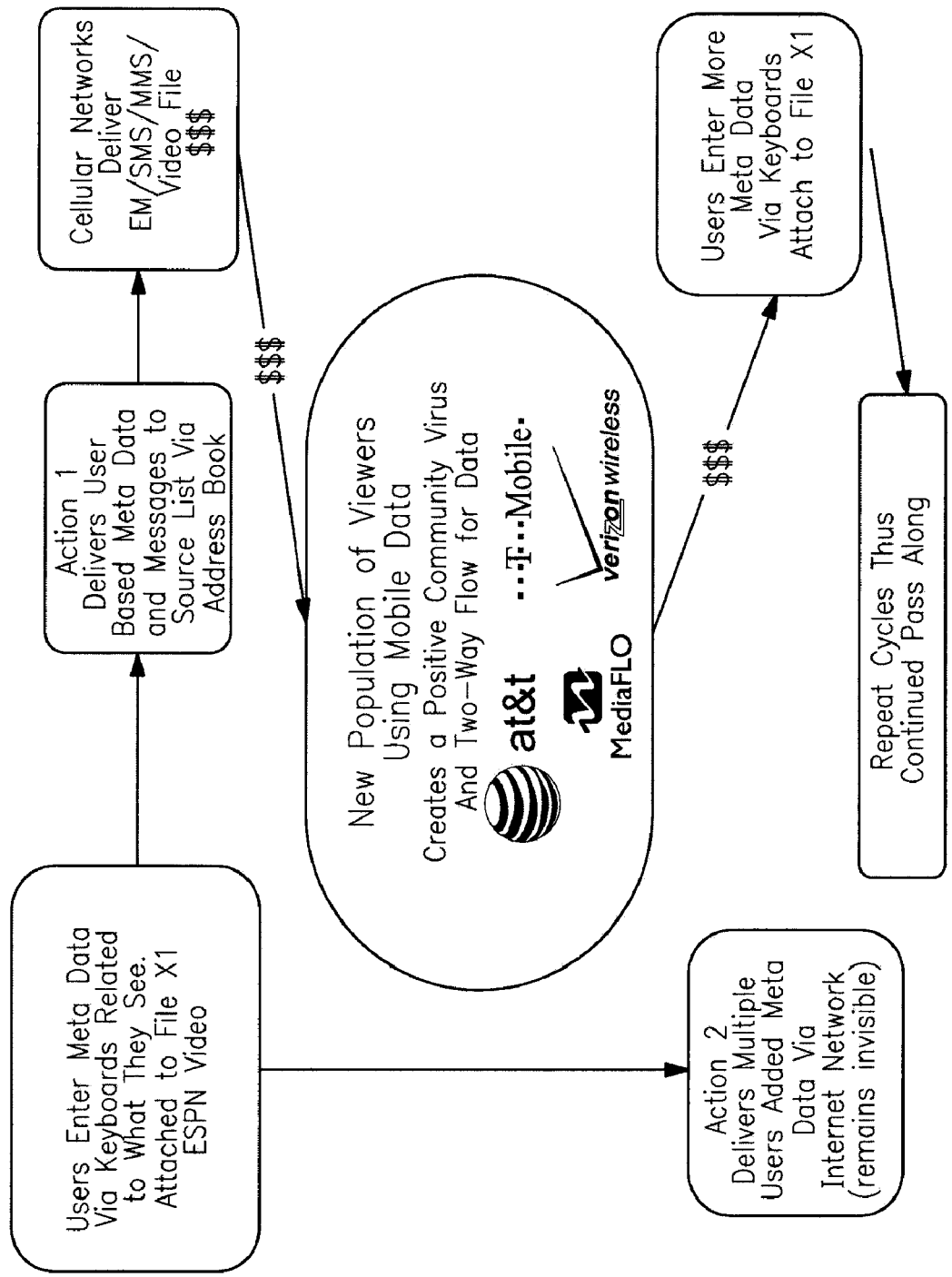
Figure 8C:
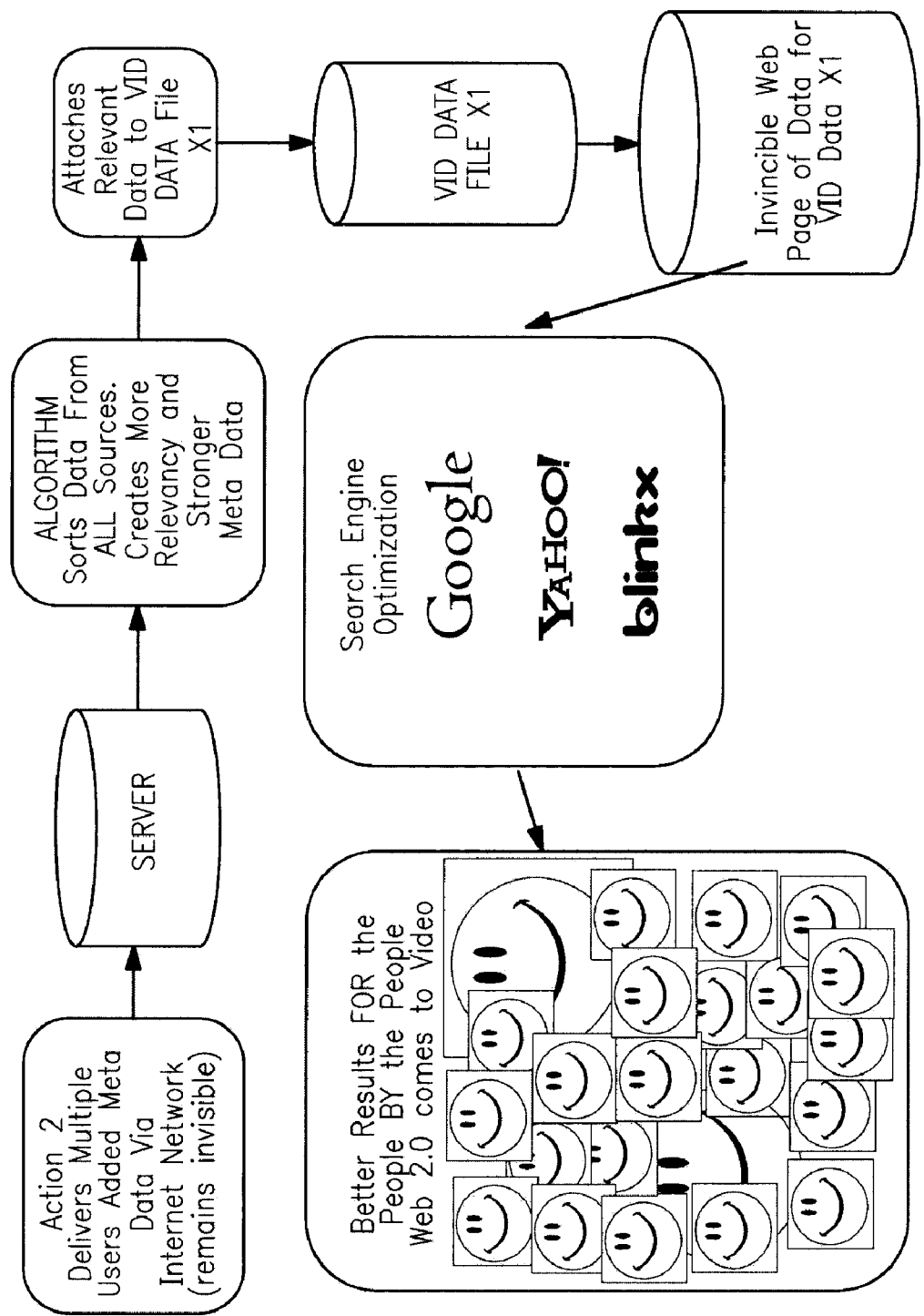
Figure 8D:
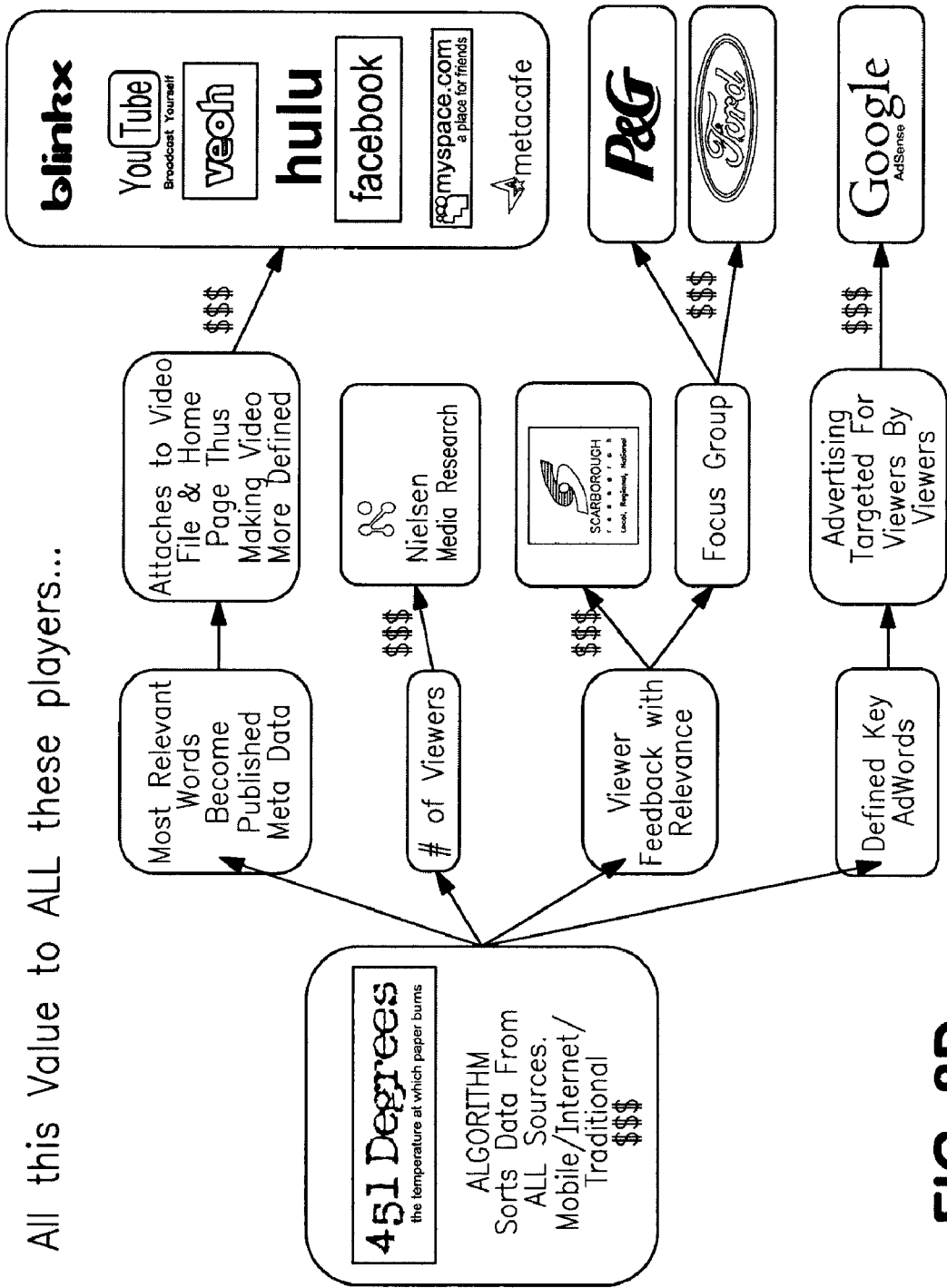

FIG. 5 is a diagram of the architecture of a media content management system in accordance with one embodiment of the invention. In this embodiment, The Network includes a media management server, a matching Data server running parallel, an advertisement server, and Text Web Pages that are ghosting behind the player unless the user, with permissions, asks to "See the Wall" at which time they can be published. The media management server, the advertisement server, and the client web sites are communicatively coupled through a network. Only the most frequently tagged data is published at any given time to Public view and can be changed based upon continued flux in relevancy determined by the system or the desire for the content owner to unpublish words to the public eye.

The media management server includes a hardware and/or software device that is configured to receive meta-tags from and/or provide the received media content through the network. Media content may include data in medium such as text, audio, still images, video, and graphics, and a combination thereof. Media content can be in different formats. For example, audio content can be encoded in Windows Media Audio (WMA) format or in MPEG-1 Audio Layer-3 (MP3) format. In one embodiment, the media management server includes a web server, an application server, a payment server, and a media store. The media management server can also optionally include other components (e.g., an email server), although FIG. 5 omits such components for clarity.

The web server is a front end of the media management server and functions as a communication gateway of the media management server. The web server receives media content meta-tag data transmitted to the media management server through the network and stores the received media content and meta-tag data in the media storage and data storage linking all together. The web server also receives requests for specific media content units from other client web sites hosting a player, retrieves the requested media content units from the media store, and provides them to the client web sites. In one embodiment, the web server and the Media Player are both Internet web servers hosting one or more websites.

The web server can support multiple communication protocols for the client web sites to send, request and sort meta-data and media content. For example, the web server can be configured to support file transfer protocol (FTP) such that the client web sites can provide and/or access media content using FTP. As another example, the web server may host web pages for users to upload and/or download media content. The web server can provide media content to the client web sites in the form of media files or media streams that are suitable for transmission over the network, where the media streams can be viewed by end users at the client web sites. Each of these portals can then allow for individual meta-tags to be inputted and match to the content. This data is then configured to match with the stream and also the advertisements that match. The meta tags become relevant based upon frequency and/or a sorting formula such as those commonly known in the art.

The application server is configured to combine media content and meta-tags and key words with advertisements and provide the combined media content and advertisement to the web server. Like media content, advertisements can include data in medium such as texts, audio and video. In some embodiments, instead of advertisements, the application server combines media content with other information (e.g., information about the subject matter of the media content).

The payment server is configured to track balances of related parties (e.g., advertisers, copyright owners, users) based on a payment model. The payment server can also work with the web server to provide the related parties online access to their accounts. The related parties can add meta-tags associated with their marketing reach, check account balance, make payments, and transfer funds to their other accounts by accessing their accounts. The payment server can also periodically send invoices and account balance reports to the related parties. In one embodiment, the payment server can be configured to enable the related parties to connect their accounts with their bank accounts and authorize the payment server to automatically deposit money to and/or withdraw money from their bank accounts.

In one embodiment, the payment server is also configured to keep track of the relationships between the media content, meta-data and the related parties. The relationships include content owners and their media content, advertisers and their advertisements, and users and the media content that they uploaded and/or downloaded as well as the meta-data they have inputted. Multiple parties can have ownership interests in one media content unit. For example, a video clip can have multiple copyright holders and multiple licensees. The identities of these content owners can be provided in the metadata accompanying the media content unit. In one embodiment, the payment server creates an account for each content owner and links the account with media content units the content owner has interests in. Similarly, the payment server can also create an account for each advertiser and associate the account with its advertisements, and create an account for each user and associate the account with media content units the user uploaded and/or downloaded. This information can be used to determine balances of the parties. The account information can be saved in the media store together with the media content and meta-tag data.

The media store and data server stores the meta-data received from the web server, the application server and the payment server. These data include media content received from the client web sites, information associated with the media content (e.g., ownership information), and information about the related parties (e.g., account information). The media store may be a relational database or any other type of database that stores the above-described data. The media store may be accessible by the web server, the data server, the application server, and the payment server. The web server, the data server, the application server, the payment server, and the media store may be stored and operated on a single computer or on separate computer systems communicating with each other through a network.

The advertisement server includes a hardware and/or software device that is configured to provide advertisements to the media management server and/or the client web sites. In one embodiment, the advertisement server includes an advertisement key word match function for each client, advertisement application server and an advertisement store.

The advertisement application server, similar to the web server and data server in the media management server, is configured to receive advertisements transmitted to the advertisement server and stores the received advertisements in the advertisement store. The received advertisements may include associated ownership information.

The advertisement store stores the advertisements and associated ownership information received from the advertisement application server. Similar to the media store, the advertisement store may be a relational database or any other type of database. The advertisement store may be stored centrally and operated on a single computer. Alternatively, the advertisement store can include multiple databases, each individually maintained by an advertiser and related based upon key meta-tags chosen by the end users or the advertisers. The advertisement store will be able to sort the appropriate "key words" to the meta-data provided by all users.

In one embodiment, the advertisement server can be combined with the media management server. For example, the application server and the web server can be configured to implement the functions of the advertisement application server, and the media store can be configured to store the advertisements and associated ownership information that would otherwise be stored in the advertisement store.

The client web site include hardware and/or software devices that are configured to transmit media content and meta-tags to and/or receive media content from the media management server and/or the advertisement server.

In one embodiment, the client web site is configured to play the combined media content and advertisements received from the media management server and/or the advertisement server. For example, the client web site can include the media player client as described above, which can play video clips received from the media management server as well as advertisement data from the servers to end users.

In one embodiment, the media management server, the meta-data server, the advertisement server and the client web sites are structured to include a processor, memory, storage, network interfaces, and applicable operating system and other functional software (e.g., network drivers, communication protocols).

The network is configured to connect the media management server, the advertisement server, the meta-data server, and the client web sites. The network may be a wired or wireless network. Examples of the network include the Internet, an intranet, a cellular network, Satellite or a combination thereof.

Operation of Media Content Management System

FIG. 4 is an interaction diagram of a process of the media content management system for meta-tagging, sharing media content in accordance with one embodiment of the invention. In this process, the media management server hosts a community website as well as media management servers on client web sites where users of the website can meta-tag live or delayed upload, download, share, and exchange media content (e.g., video clips). The process illustrated in FIG. 4 may be implemented in software, hardware, or a combination of hardware and software.

The process illustrated in FIG. 4 starts with a client web site a receiving a media stream. As described above with reference to FIG. 4, the client web site A can include a media device receiving media content and/or media stream from a plurality of sources, such as a TV broadcasting network. The client web site A can be configured to play the media stream to a user as the stream is received and will allow for real time meta-tags to be dropped into the video and delivered to the data server to match with the video and advertisement servers when called upon. This same user generated data will be sorted and matched according to the pattern established by the network to best match the use. It will also be distributed through various channels of announcement electronically The client web site A captures a media clip in the received media stream. In one embodiment, the client web site A continually captures and caches the most recently received media stream. The user can use a graphical interface provided by the client web site A to meta-tag in the portion of the media stream that the user would like to. This data is then matched through the data server to the video and advertisement servers.

The client web site A sends the captured media clip to the community website using a communication protocol supported by the web server. The web server can require the user to first become a community member by registering an account before they can meta-tag or upload any media content in the community website or any client web sites or other points of distribution and thus aggregation of multiple and often similar user generated meta-tags. The client web site A can be configured to send the media clip to the community website or any other electronic forms including but not limited to RSS, SMS, MMS, E-mail, News Feed Alerts using the user's account.

After receiving the media clip from the client web site A, the web server stores it in the media store. In one embodiment, the web server also receives identification information related to the received media clip, and stores it in the media store along with the media clip and any relevant data information generated from the media clip. The web server can provide the received media clips on the community website for members to access.

The application server combines advertisements and user generated data via meta-tags with the received media clip. Tags become relevant and sorted via the system and this establishes more relevant rankings and truth to content as well as opportunity to be found. As described above with reference to FIG. 4, the application server can receive advertisements from the advertisement server through the web server and the network.

The application server can combine the media clip and the advertisements in different manners. As described above, media content and advertisements can include data in medium such as text, audio, still images, video, and graphics. The application server can determine a manner to combine a media clip and an advertisement based on the forms of information included in the media clip, user generated meta-tags and the advertisement. For example, if both include video and/or audio, the application server can join them together, so that the advertisement leads into or follows the media clip. Both of these applications are then joined with any relevant meta-tags that are associated with the content. As another example, the application server can present the advertisement alongside the media clip in a web page, such that interested users can access the web page for the media clip, and thereby view the advertisement. As still another example, the application server can place the advertisement as an overlay to the video portion of the media clip. The application server can combine the advertisements with the media clip when the web server first receiving the media clip or after receiving a request for the media clip. Alternatively, the application server can conduct the combination periodically.

In one embodiment, the application server can be configured to enforce restrictions associated with the media content, user generated meta-tags, individual users, key words and the advertisements. The advertisements can have restrictions limiting the media content that can be associated with them. For example, an advertiser can prohibit its advertisements from being associated with media content including adult material. As another example, an advertisement (e.g., an automobile advertisement) can require the associated media content to include content relevant to the subject matter of the advertisement (e.g., video clips about high end cars). Media content can also have restrictions limiting the advertisements that can be associated with the media content or the user generated meta-tags associated with them.

In one embodiment, the application server identifies restrictions associated with the media clip and/or the advertisements and combines the media clip and the advertisements only if the associated restrictions are satisfied. For example, the application server can combine the media clip with advertisements by first identifying advertisements that satisfy restrictions associated with the media clip, then matching the meta-tag words with key words, then selecting one or more of the identified advertisements where the combination does not violate the restrictions associated with the selected advertisements, and combining the media clip with the selected advertisements.

Another user of the community website sends a request for the media clip to the community website using a client web site B. After receiving the request, the web server provides the combined media clip and advertisements matching with meta-tag data relevant to the client web site B through the network. The web server can provide the combined media clip and advertisements in different manners. For example, the web server can send an email to the user containing the associated advertisement and a pointer reference to the media clip. The user can access the media clip by clicking the pointer reference. Alternatively, the web server can provide the user with a webpage including the combined media clip and the advertisements. After receiving the combined media clip and advertisements, the client web site B can play it to the user. At any time during this process the user can generate new meta-tags to attach to the clip with all tags being relevant in accordance with the formula developed to associate values to the meta tags.

The operator of the community website may receive an advertisement fee from an advertiser in exchange for providing the combined media clip, the meta-tags and advertisement to the user. As described above with reference to FIG. 5, the payment server keeps track of the relationship between the advertisers, meta-tags and their advertisements. Therefore, the payment server can identify the advertisers associated with the combined advertisements, appropriate meta-tags, determine the advertisement fees for the advertisers to pay, and charge the advertisers accordingly.

In one embodiment, the advertisement fees are determined by a standard advertising model (e.g., Pay Per Click Advertising (PPC), Pay Per Thousand Advertising (PPM), Fixed Rate) determined by the operator and the advertisers. Various advertising models may be used with The Network. The advertising model can provide a range of advertising fees based on multiple factors, such as the nature of the advertisement (e.g., video, audio, banners, bumpers, bugs or text) and the manner of the association (e.g., the advertisement is joined with a video clip or surrounds it FIG. 1 [A1, A2]). The payment server can charge the advertising fees from the advertisers by debiting their accounts.

The operator of the community website may also provide a portion of the advertising fees to a content owner in exchange for permission to provide the combined media clip and advertisement to the users. Any user-generated meta-tags will be the property of The Network owner 451 no matter where it comes from whether they generated the video or a third party. As described above with reference to FIG. 5, the payment server keeps track of the ownership information of the media content. Therefore, the payment server can identify the content owners of the media clip, determine the portion of the advertising fees to the content owners, and credit the content owners accordingly.

In one embodiment, the payment is determined by a royalty rate determined by the operator and the content owners. Similar to the advertising model, the royalty rate can provide a range of royalty payments based on factors such as the nature of the media content. In one embodiment, the royalty is a fixed percentage of the advertisement revenue generated by providing advertisements with media content owned by the content owner. The content owners can also set a fixed fee for their media content. For example, the owner of a video clip can require per access to the video clip. The payment server can provide the royalty payment to the content owners by crediting their accounts.

Business Model for the Media Content Management System

FIGS. 4 and 5 are diagrams FIG. 4 is a diagram depicting the interactions among entities involved in the operation of the media content management system (hereinafter called "The Network") according to a business model. The interactions illustrated in FIG. 4 may be implemented in software, hardware, or a combination of hardware and software.

As illustrated in FIGS. 4 and 5, The Network can operate to enable users to share and exchange media content, generate personal meta-tags to content, generate advertising revenue by distributing advertisements with the media content, and share the revenue with content owners in exchange for permissions to provide the media content to users with the advertisements. Instead of or in addition to sharing the revenue with the content owners, The Network enables the content owners to control the use of their media content by providing restrictions for permissions to provide their media content to users with the advertisements based upon key words and meta-tags delivered by multiple users.

Entities involved in the operation of The Network include an operator of the community website, advertisers, content owners, client web sites, Content web sites, Meta-tag Data Entry Users, "Graffiti" Artists and users. The operator runs the media management server to provide a community website for the users to meta-tag, store, share, and exchange media content, and distribute advertisements with the media content to the users. The advertisers provide advertisements to the community website to be provided to the users together with the media content based on relevant meta-tags affiliated with the content in exchange for payments. The users share media content through the community website, client web sites, Cellular devices, Satellite devices, PDA's, Media networks and other unlisted distribution platforms. The content owners give the community website and operator rights to distribute their media content to the users in any way they see fit including but not limited to traditional media, Internet, digital and wireless distribution in exchange for payments and/or control.

The community website receives media content from the users. Allows users to meta-tag content in "real time" or when the player is paused to allow for streams of data to be attached to the given media. This data is aggregated and sorted, optionally in common and accordance to formulae commonly known in the art to create relevance from all sources. As described above with reference to FIG. 4, the community website can require the users to become registered members; to meta-tag content, to upload media content to and/or download media content from the community website. The received media content include media content that the users are interested in themselves and/or feel will have a wide appeal to a large audience. The users can also provide descriptive information about the media content to the community website via all meta-tags that they add to the tags already within the clip or repeating tags that give more credibility or less credibility to those in place already. Thus adding to the meta-tag tail and graffiti wall that will reside behind the player and be available for "publishing" within locations chosen and approved by The Network owner. Certain users will be allowed to edit to meta-tags to be controlled by The Network owner.

By way of example, if 1,000 individuals watch a video such as a Presidential Debate, they will have different "points of view" and thus comments to share. All comments are relevant to what people see and feel. Some of these comments will be similar and others diverse. The Debate will have its original meta-tags associated with it such as "Kennedy, JFK, Nixon, US Presidential Debates . . . " (e.g., a total of 15 words are used to describe the video). The original meta tags allow users to find the video via these elements but the ability to interact with the video and comment in real time to the "issues" and feelings that they feel are relevant will make the video content that much more defined and rich. Of the 1,000 people there will be many similar statements made. For instance, 622 people may type in "Kennedy WINS!" and that is the most popular word and phrase in common amongst the viewers tagging the video stream. The most tagged words then become the "true" meta-data for the file. The top words used to describe will then define the video. All other words and descriptions and phrases will be attached to the file as well and then sorted according to usage and relevancy. This video can continue to be watched and commented on at anytime thus always allowing it to "live and breathe and become more relevant for Search Engines as more data gets attached to it. The video may have started with the original 15 meta data words but now there are thousands of words and they are more full of definition and reality and the tags will transfer into this format, "Kennedy (622), Nixon (432), Kennedy Wins (622), 1960 Debates (298), Presidential debates (290). The numbers are not necessarily published but are there to give a sense of relevancy in context to viewers and times they were tagged. These tags can change if and when a different phrase or word becomes more relevant based on new users.

The community website receives and sets restrictions of the media content and meta-tags as well as conflicting meta-tags that will not be accepted from the content owners. In one embodiment, a media content unit can have one or more associated restrictions limiting the use of the media content unit and the meta-tags that end users can input to the media. In one embodiment, these restrictions can be provided in the metadata of the associated media content. For example, restrictions associated with a video clip can be transmitted during the Vertical Blanking Interval (VBI) when the video clip is transmitted to the media management server. VBI is the period of time between frames in a video transmission when information is still being transmitted but when the information is not being displayed on the screen. Alternatively, the web server can be configured to accept these restrictions separately from the associated media content. For example, the content owners can set restrictions applicable to all or a portion of their media content or meta-tags they chose by interacting with the web server. The content owners can also set restrictions applicable to their media content or meta-tags not yet in the media management server.

In one embodiment, the community website and client web sites can enable the content owners to set a broad range of restrictions to their media content meta-tags and distribution such as: the duration, the quality (resolution, frame rate of a video content, bit rate of an audio content), and the number of people allowed to access the media content. For example, a content owner can set a generic rule like: "No advertisers associated with Ford Cars". After identifying a piece of media content or meta-tags containing "Ford" or "Ford Cars" or named tag "Ford" video clip, the community server may allow access to the media content only if the restriction is not violated. The community website can be configured to modify the media content and meta-tags (e.g., reduce the duration and/or resolution of a video) to enforce the associated restrictions. Alternatively, the modification can be conducted on the user side (e.g., the client web sites can be configured to enforce the restrictions).

Content owners may also restrict the access to their media content. For example, the content owners can restrict the access to a media content and meta-tagging unit to be by invitation only (e.g., sharing video clips with friends and acquaintances) or available only to registered members. Therefore, the community website will allow users to access a media content unit only if the associated restrictions set by the content owners are satisfied.

Content owners may also restrict the advertisements that can be associated with their media content or meta-tags. For example, a media content unit can have a restriction prohibiting any association with automobile advertisements or meta-tag words associated with it. As another example, a piece of media content can have a restriction limiting the duration or visibility of the associated video advertisement.

Under this business model, content owners may have strong incentives to allow sharing of their media content with the public to promote the popularity of the media content and generate more royalty income, even without receiving a portion of any advertising revenue. For example, Walt Disney Studios may specify in the restrictions that its Mickey Mouse media content are publicly available to promote a re-release of a Mickey Mouse movie or to promote visiting its theme parks. The content owners may have additional incentives by allowing third-party advertisers to attach their own advertisements or meta-tags to the clipped video content, by then receiving a portion of or the entire advertising fee.

The community website receives advertisements and key meta-tag words from the advertisers to be associated with. The community website can also receive restrictions from the advertisers based on meta-tags, content or any other variable of interest. Similar to the restrictions provided by the content owners, these restrictions limit the media content and meta-tags to be combined with the advertisements, and thereby enable the advertisers to better target their advertisements to the right audience.

The community website combines the media content and user generated meta-data with the advertisements. This combination normally must satisfy the restrictions provided by the content owners, users and the advertisers. The community website and client websites then provides the combined media content and the advertisements to the users.

The operator receives advertising fees from the advertisers for distributing the advertisements to the users and client web sites. The operator can share this revenue with the content owners for permissions to provide the media content to the users with the advertisements, to the extent the content owners have rights in the media content. The user-generated meta-data will remain the property of The Network owner.

In one embodiment, the community website distributes the advertising revenue among all entities involved in the operation of The Network, including the operator, the content owners, the client websites and even the users that uploaded and/or downloaded the media content. In other embodiments, the advertising fees may be shared just between a subset of the parties, such as the content owners, performers and the operator. In still other embodiments, the advertising fees may be shared with other participants in the distribution chain of the media content, such as the operator of the originating television service (such as a cable provider, especially if the media content originate from content served by an associated set top box), Cellular providers, Cellular Video Distribution channels, Cellular content aggregators, an Internet service provider (ISP) that provides the bandwidth used by the source (such as a place-shifting device), and/or the ISP that provides the bandwidth used by the client web site (such as a wireless network provider in the case where the client web site is a portable device using a wireless network).

As described above, the operator can operate The Network to generate advertising revenue by distributing user-supplied media content and meta-tags with advertisements. The operator can share the revenue with the content owners in exchange for permissions to provide the media content to the users with the advertisements. The Network also provides the content owners with the ability to control the use of their media content and associated user generated meta-tags to address their fears of losing control over their media content and its associations.

Embodiments of the invention can provide a web portal and a delivery system to other search engine for users to share and exchange media contents with more precise results based upon user inputted meta-tags that better define what is relevant to a given video clip based upon users input, its frequency as well as relevancy and establish a data search common in practice thus giving Video scripted data to define its placement and relevance. Through this process video becomes a living and breathing written document through the user generated sourcing of meta-data that is relevant to any Video. This data document continues to grow through user generated and common relevant point of view input from multiple viewers. The users and viewers of Video are able to generate the purest information for proper sorting through interaction. Operator of the web portal can generate advertising revenue by distributing advertisements together with media contents to the users, and share the revenue with the distribution channel owners to compensate them for their permissions to provide their web landscape to the users and content delivery properties.

Any of the steps, operations, or processes described herein can be performed or implemented with one or more hardware or software modules, alone or in combination with other devices. In one embodiment, a software module is implemented with a computer program product comprising a computer-readable medium containing computer program code, which can be executed by a computer processor for performing any or all of the steps operations, or processes described. For example, the physical components used in The Network may depend on the method in which the media content is delivered to one or more users of that media content. An illustrative example of The Network and methods described herein can be found in FIGS. 8A-D, herein.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above teachings. It is therefore intended that the scope of the invention be limited not by this detailed description, but rather by the claims appended hereto.

Finally, it should be noted that the language used in the specification has been principally selected for readability and instructional purposes, and may not have been selected to delineate or circumscribe the inventive subject matter. Accordingly, the disclosure of the invention is intended to be illustrative, but not limiting, of the scope of the invention, which is set forth in the following claims.

Although the invention has been described with reference to the above example, it will be understood that modifications and variations are encompassed within the spirit and scope of the invention. Accordingly, the invention is limited only by the following claims.

What is claimed is:

1. A computer-implemented method for sharing media content comprising:
 playing a media stream on a display of a local computing device;
 receiving a user command to meta-tag a portion of the media stream via a user interface while playing the media stream;
 creating meta-tags related to at least a portion of the received media stream via the users' input, wherein new meta-tags are continually created based on real time input from the users and sorting the frequency of multiple tags from multiple users; and transmitting the meta-tag data to a computing and distribution system, wherein the step of creating meta-tags is interactive in real time thereby creating meta-tags with current relevance to the media content.

2. The method of claim 1, wherein the media stream is received from a media system.

3. The method of claim 1, further comprising capturing the received media stream in a memory of the local computing device.

4. The method of claim 1, further comprising receiving a user selection that defines a start point and an end point for the meta-tag within the media stream, the user selection used in meta-tagging.

5. The method of claim 4, wherein the user selection is received via a graphical interface that allows a review of the media stream.

6. The method of claim 1, further comprising delivering information into a clip; receiving information related to the clip; and associating the information with the clip, and optionally sorting the relevancy to multiple meta tags similar and unique from multiple users based upon a formula.

7. The method of claim 6, wherein the information is received at least in part from a user input.

8. The method of claim 6, wherein the information is received at least in part from an automatic process for obtaining information about the clip.

9. The method of claim 6, wherein the information is received at least in part by extracting, inputting or searching meta data embedded in the media stream via a live cursor located within.

10. The method of claim 6, wherein any video location, server or website is scrubbed for data obtained from at least one location where a video resides and attached to the video clip and its, wherein the location as meta data relevant to the video is identified.

11. The method of claim 1, wherein transmitting the meta-data comprises uploading the meta-data to a media content sharing website or network of distribution.

12. A computer readable storage medium and a computer program mechanism embedded therein for performing a method of claim 1.

13. Content produced by the method of claim 1.

14. A method of providing content produced by the method of claim 1 to a user, comprising accessing the content; tracking the content accessed, an associated provider or providers for the accessed content, the number of times the content was accessed, the multiple meta tags associated with the clip via user generated input similar and unique and optionally a fee associated with use of the content.

15. The method of claim 14, further comprising determining a service fee or license fee for access to the content.

16. The method of claim 14, further comprising obtaining content from one or more of local memory, an internet connection, over air, Radio Frequency (RF), cellular connection, a wireless connection, a remote server, a portable memory device, a compact disk, digital video disk, optical disk, magnetically recorded tape, digitally recorded tape, a computer, or a scanned image.

17. The method of claim 14, wherein accessing content comprises selection by the user of a content category; searching for content in the content category; and providing search results to the user.

18. The method of claim 17, further comprising printing a transaction record.

19. The method of claim 18, wherein the transaction record comprises one or more of a list of accessed content, the fee for each accessed content, the service fee, copyright information on accessed content, or a federal copyright protection warning.

20. A computer program product for sharing media content, the computer program product comprising a computer-readable medium containing computer program code for performing a method comprising: playing a media stream on a display of the local computing device; receiving a user command to identify a portion of the media stream via a user interface while playing the media stream; responsive to receiving the user selection, creating a meta-tag associated with a portion of the received media stream wherein the meta-tags are continually created based on real time input from users; and responsive to creating the meta-tag, transmitting the meta-tag to a computing and distribution system, whereby creating meta-tags associated with the media stream occurs in real time, thereby creating meta-tags with current relevance to the media content.

21. The computer program product of claim 20, wherein the media stream is received from a media delivery system.

22. The computer program product of claim 20, further comprising catching the received media stream in a memory of the local computing device.

23. The computer program product of claim 20, further comprising receiving a user selection that defines a start point and an end point for the meta-tag within the media stream, the user selection used in creating the meta-tag.

24. The computer program product of claim 23, wherein the user selection is received via a graphical interface that allows a review of the media stream.

25. The method of claim 23, further comprising aggregating and sorting multiple users, words and phrases.

26. The computer program product of claim 21, further comprising receiving information related to the meta-tag; and associating the information and relevancy with a video associated therewith.

27. The computer program product of claim 26, wherein the information is received at least in part from a user input.

28. The computer program product of claim 26, wherein the information is received at least in part from an automatic process for obtaining information about the video.

29. The computer program product of claim 26, wherein the information is received at least in part by extracting meta-data embedded in the media stream.

30. The computer program product of claim 26, wherein the information is aggregated from multiple sources and sorted.

31. The computer program product of claim 20, wherein transmitting the clip comprises uploading the meta-data to a media content sharing website or distribution center or database.

32. The computer program of claim 20, further comprising creating an invisible page of data and words within the pages of the original web site of user generated meta-data for the purpose of search via "spiders" or any other means associated with Web Search technology.

33. An integrated media system for sharing media content, comprising: a media player module for playing a media stream, the media stream received by an integrated media stream; a media editor module for caching the media stream, receiving user selection and relevant meta-tag of the media stream, and creating a clip comprising at least a portion of the media stream based on the user selection; and a network client module for transmitting the meta-tags to a computing or distribution system and optionally to an invisible web page wherein the meta-tags associated with the media stream change in real time based on user input.

34. The integrated media system of claim 33, wherein the content is selected from text, a symbol, an image, a movie or portion thereof, an audio clip, a video clip, or any combination thereof.

35. A method for sharing media content comprising:
receiving a media stream on a local computing device; playing the media stream on an integrated user interface; receiving a user command to meta-tag the media stream via the integrated user interface; responsive to receiving the user command, displaying a media meta-tag window via the integrated user interface; receiving user meta-tags for defining a portion of the media stream via the media edit window; responsive to receiving the user selection, creating a meta-tag comprising the defined portion of the media stream based on the user input, wherein new meta-tags are continually created based on real time input from the users; transmitting the meta-tag data to a computing system via the integrated user interface; and responsive to receiving meta-tags, ranking all meta tags transmitting the clip to the distribution channel system associating the video with these key words throughout, whereby the method of receiving and transmitting the meta-tags is repeated in real time thereby increasing the relevance of the meta-tag data.

36. The method of claim 35, further comprising: receiving meta-data information related to the video via the integrated user interface; and associating the received information with the video.

37. The method of claim 1, 35 or 14, wherein the content is selected from text, a symbol, an image, a movie or portion thereof, an audio clip, a video clip, or any combination thereof.

38. A computer program product for sharing media content, the computer program product comprising a computer-readable medium containing computer program code for performing a method comprising: receiving a media stream on a computing device; playing the media stream on an integrated user interface; receiving a first user command to meta-tag the media stream via the integrated user interface; responsive to receiving the user command, displaying a media edit window via the integrated user interface; receiving a user meta-tag for defining a portion of the media stream via the media edit window; responsive to receiving the user meta-tag, creating a meta-tag comprising the defined portion of the media stream based on the user entry and optionally a formula ranking to relevance; transmitting the clip to a computing and distribution system via the integrated user interface whereby the method of receiving and transmitting the meta-tags is repeated in real time thereby improving the relevance of the meta-tag data.; and responsive to receiving the meta-data command, transmitting the video to the computer, data and distribution system.

39. The computer program product of claim 20 or 38, wherein the content is selected from text, a symbol, an image, a movie or portion thereof, an audio clip, a video clip, or any combination thereof.

* * * * *